United States Patent [19]

Schatz

[11] Patent Number: 5,251,688
[45] Date of Patent: Oct. 12, 1993

[54] VACUUM INSULATING STRUCTURE SUITABLE FOR THE TRANSMISSION OF THRUST FORCES, MORE PARTICULARLY FOR HEAT STORAGE MEANS IN MOTOR VEHICLES

[76] Inventor: Oskar Schatz, Waldpromenade 16, D-W-8035 Gauting, Fed. Rep. of Germany

[21] Appl. No.: 713,888

[22] Filed: Jun. 12, 1991

[51] Int. Cl.⁵ .............................................. F28D 20/00
[52] U.S. Cl. ........................................ 165/10; 165/41; 165/135; 220/421; 220/423; 220/445; 220/424; 123/41.14
[58] Field of Search .............................. 165/10, 135, 41; 220/445, 421, 423, 424, 426; 123/41.14

[56] References Cited

U.S. PATENT DOCUMENTS

| 3,149,742 | 9/1964 | Hay et al. | 220/901 |
| 3,289,423 | 12/1966 | Berner et al. | 220/423 |
| 3,441,164 | 4/1969 | Wang | 220/423 |
| 3,487,971 | 1/1970 | Kirgis et al. | 220/423 |

FOREIGN PATENT DOCUMENTS 3614318 10/1987 Fed. Rep. of Germany ........ 165/10

Primary Examiner—Albert W. Davis, Jr.
Attorney, Agent, or Firm—Harness, Dickey & Pierce

[57] ABSTRACT

In the case of a vacuum insulating structure adapted for the transmission of thrust forces and more particularly for the heat storage means of motor vehicles in an evacuated insulating zone and at least in the zones with a need of bracing a continuous, load-bearing brace means of pore-forming insulating material is arranged, whose mass density is so reduced that the load-bearing capacity thereof is just sufficient to take up the thrust forces to be transmitted. The gas pressure in the insulating zone is correspondingly reduced in accordance with the necessary insulating effect.

17 Claims, 2 Drawing Sheets

VACUUM INSULATING STRUCTURE SUITABLE FOR THE TRANSMISSION OF THRUST FORCES, MORE PARTICULARLY FOR HEAT STORAGE MEANS IN MOTOR VEHICLES

BACKGROUND OF THE INVENTION

The invention relates to vacuum thermal insulation suitable for the transmission of thrust forces and more particularly for heat storage means in motor vehicles, comprising an evacuated insulating zone and a load-bearing brace member of pore-forming insulating material.

Owing to the exacting requirements as regards costs, weight, volume and efficiency which have to be met by heat storage means, which are intended for use in motor vehicles, the invention will be described with reference to such heat storage means without the application thereof being limited to this purpose.

These exacting requirements lead to a series of problems. Owing to the requirement for high efficiency, in the present case with respect to the tolerable heat dissipation, it is only possible to employ vacuum insulation. Owing to the limited amount of space available in modern motor vehicles, which is due, among other reasons, to the higher expectations as regards mileage and exhaust gas emission, such heat storage means are to be as small as possible and light in weight and the external configuration is to be able to be modified by the designer so that the heat storage means may be accommodated in small spaces.

Conventional insulating techniques provide two types of vacuum insulation, that is to say high vacuum insulation on the basis of the Dewar vessel, which has been known for approximately 100 years, and microporous insulation. In this case the thermal flux is interrupted by three main paths—gas convection, thermal radiation and thermal conduction—in various different ways, although the external structure remains the same: the heat storage means is enclosed within a double-walled insulating vessel constituted by an inner and an outer container, such vessel being hermetically sealed and being able to maintain a vacuum for a long period of time.

The term high vacuum insulation is used to denote a type of thermal insulation, in the case of which the gas pressure in the insulated zone is under $10^{-3}$ mbar and in the entire insulating zone devices are arranged for the reflexion of the thermal radiation.

In the case of high vacuum insulation thermal conduction and gas convection are prevented because the space is evacuated to be substantially free of gas and measures are taken to ensure that such vacuum is maintained for prolonged periods of time of for the instance 10 years, for which purpose getters may be used.

In the case of high vacuum insulation the pressure varies between $10^{-7}$ and $10^{-3}$ mbar, the free paths of the gas molecules amounting to between 10 m and 1 mm. Therefore below a pressure of $10^{-3}$ mbar it is possible for the path length to be under its characteristic value in the insulated space of 1 mm, which is at the limit of what may be manufactured, for the prevention of thermal conduction of the gases. The gas convection is prevented by the low mass density.

The thermal radiation is for instance prevented by coating the walls of the insulated space with reflecting materials such as films of aluminum, copper or silver. These measures are slow to perform and are cost-intensive. The result is a highly intensive thermal insulation with a minimum space requirement, because the insulating effect is not dependent on the thickness of the gap, that is to say the wall distance between the inner and the outer containers. It only has to exclude the possibility of contact between the walls. The weight of the insulation only results from the weight of the outer container.

In the case of insulating vessels with a curved encompassing surface running between two end surfaces, and more particularly of circularly cylindrical insulating vessels, the forces resulting from the pressure difference between the vacuum space and the surroundings as compressive forces are taken up in the outer container, the wall needing some means to prevent buckling. This preventative means may be for instance in the form of circularly cylindrical corrugations following the curvature so that there is a dimensionally stable and light-weight outer container.

In the case of other configurations of vessel, more particularly with planar surfaces, high vacuum insulation is seldom utilized owing to the costs, the space requirement and the weight of the brace means to resist the vacuum pressure.

The microporous vacuum insulation consists of solid materials with a low thermal conductivity. The spatial distribution of the material is such that it is pervaded by a system of small pores (micropores), which may be evacuated. It is generally a question of fibers, powders and foams. Owing to the widespread use of glass fiber insulation this material will be taken as a basis for further explanations.

The pore size is defined as the diameter of the fibers and their distance apart. The fiber distance may be readily ascertained indirectly by weighing and bulk density, referred to as density for short, measurement. In lieu of the pore size, which may be hardly measured directly, calculations are therefore based on bulk density and fiber diameter.

The commonest fiber diameter is approximately 5 microns. In the case of a density of 200 to 300 g/l the minimum thermal conductivity is attained at 1 mbar. If at this pressure the density is increased, the thermal conductivity of the insulation will increase as well, because the conduction through the fibers increases. If at this pressure the density is reduced, the thermal conductivity of the insulation will also increase, because conduction in the gases also increases. Therefore it is possible to conclude that in the case of these values for the fiber diameter and the density the characteristic pore size is just less than the free path of the gas molecules, which at a pressure of 1 mbar is equal to approximately 1 micron.

In order to reduce the flow of heat by colliding gas molecules, the condition "pore size<free path" has to be fulfilled. Furthermore, convection due to gas molecules has to be prevented, something that is also effected by the glass fiber.

If on the other hand the density is maintained constant at for instance 250 g/l and if the pressure is reduced to under 1 mb, there will be no further reduction in the thermal transfer at the latest on reaching the high vacuum range (below $10^{-3}$) and it will maintain itself at a level which is high in comparison with high vacuum insulation. This amount corresponds to the conduction in solids, that is to say in a glass fiber and its value decreases with the thickness of the insulating layer.

Therefore it is necessary for the thickness of the insulating layer to have a value corresponding to the desired thermal insulating effect and owing to the high density, which is necessary to make the pores sufficiently small, micropore insulating structures have a large bulk and weight. Furthermore the costs of the insulating material are dependent on this.

In the case of micropore glass fiber insulation the thermal radiation is checked by the fibers. This effect may be increased by the use of suitably colored fibers.

As regards its efficiency, volume and weight high vacuum is clearly superior to micropore insulation. With respect to the comparative costs experts are not however unanimous in their views. As regards the shaping of the structures to be insulated micropore insulation has a clear lead since it is suited to all different configurations of the insulating vessel, even those with flat container walls, because it can transmit thrust forces.

Steps taken towards a combination of the advantages of both forms of insulation are for instance described in the German patent publication 3,725,167 A. In this case the thermal insulation is divided up into brace members with micropore thermal insulation and interstices with a high vacuum insulation so that the insulating zone is subdivided up into alternating zones, in which respectively the one or the other of the above mentioned conventional thermal insulating structures are utilized, namely high vacuum insulation and micropore insulation.

It would be possible to attempt to adapt the quantity of the supporting insulating material employed to the load. However, the complexity of production and assembly of mutually separated supporting brace means renders it impossible to attain sufficiently small supporting distances in order, without reinforcement of the walls of the insulating zone, to take full advantage of the mechanical load limits of the insulating material. Therefore the thermal conduction, the volume and the weight are higher in practical applications than would appear to be theoretically possible. Practical testing has therefore not fulfilled expectations.

SHORT SUMMARY OF THE PRESENT INVENTION

Accordingly one object of the invention is to provide a thermal insulating structure of the type initially mentioned such that there is a full efficiency of the thermal insulating effect with a low bulk and a low weight as regards transmission of thrusts.

A still further object of the invention is to provide such a structure at minimum costs for the material, assembly and evacuation.

In order to achieve these or other objects appearing from the present specification, claims and drawings, the load-bearing, pore-forming insulating material in the insulating zone is arranged, at least in the zones with a need to be supported, continuously, the mass density of the insulating material is so reduced that it is just sufficient to take up the thrust forces to be transmitted and the gas pressure is reduced in accordance with the desired insulating effect and furthermore preferably the vacuum in the evacuated insulating zone is a high vacuum and in the entire insulating zone means are provided in order to impede thermal radiation. The vacuum is preferably so selected that the forecast gas pressure at the end of the intended duration of use of the thermal insulation is less than $10^{-3}$ mbar.

Since the load supporting capacity of such glass fiber insulation, given by way of example amounts to approximately 10 bar at 250 g/l, in the case of supporting of the full vacuum pressure of flat walls a density of 25 g/l is sufficient and in the case of prevention of buckling of a circularly cylindrical vessel assuming a gas pressure of 0.5 bar a density as low as 12.5 g/l is sufficient.

In view of the low mass density the solid state conduction of the fibers is low so that the insulation thickness may be designed to be near the thickness, which is the least thickness able to be manufactured at an economic price, of the insulating zone and amounts to approximately 5 mm. This constitutes a significant advantage over conventional glass fiber insulation for flat-walled vessels, whose thickness must be equal to at least 15 mm in order to obtain a comparable insulating effect.

The weight of the insulating material is negligible owing to its low density and to the small size of the insulating gap.

For application to circularly cylindrical vessels the space necessary may be halved because stiffening corrugations are not required.

The costs of the insulation in accordance with the invention are less than in the case of conventional insulation despite the functional improvement as regards insulating properties, volume and weight in the case of circularly cylindrical and flat-walled insulating vessels.

In accordance with a further possible development of the invention the brace means is prevented at least from making thrust contact with either of the two delimiting means, which are associated with the different temperature zones, of the insulating zone. Because the delimiting means of the insulating zone in the case of thermal insulation with curved walls have self-supporting properties, a brace means is not necessary, providing the curvature responsible for the self-supporting properties is maintained. It is only for instance if a local thrust and a deformation resulting from it impairs the self-supporting properties of the delimiting means that the brace means will come into pressure transmitting contact with the two delimiting means and will ensure maintaining the insulating zone. Therefore in accordance with an advantageous embodiment of the invention the brace means is positioned at a distance from the outer wall of the insulating zone so that in a normal case, that is to say as long as the delimiting means maintains its self-supporting properties, there is no solid state thermal conduction through the insulating zone.

A further possible feature of the invention is such that on its side facing the outer wall the brace means is covered with a film arranged with a clearance from the wall, such film preferably compressing the insulating material constituting the brace means with a pretensioning effect so that if the brace means has to become effective its resistance is predetermined by the pretension which is present.

More particularly in the case of a circularly cylindrical thermally insulating arrangement it is possible for the brace means to constitute a self-supporting member, whose external diameter is smaller than the internal diameter of the outer wall and the internal diameter is larger than the external diameter of the inner wall of the insulating zone. In this respect it is possible for the member to come into linear contact with one of the delimiting means of the insulating zone under the action of gravity as long as its supporting function is not used.

In accordance with a further possible development of the invention the thrust contact of the brace means with at least one of the two delimiting means associated with different temperature ranges is restricted to a few contact points, and in accordance with a particularly advantageous embodiment of the invention for limiting the thrust contact the insulating material is covered at least on one side with a film with molded projections.

In order to oppose thermal transmission by radiation in the case of the use of a film a further advantageous development of the invention is possible in which at least one surface of the film consists of a metal with a high coefficient of reflection.

The production of the thermal insulation is facilitated if in accordance with a further development of the present invention the insulating material is prevented from making direct contact with the two delimiting means and the elements preventing such contact are connected with the insulating material as a prefabricated sub-assembly.

In accordance with a further possible development of the invention the brace means consists of at least two parallel arranged layers of insulating material with a thermally reflecting film arranged between each pair of adjacent layers or plies.

In accordance with a particularly preferable embodiment of the invention the insulating material is in the form of a dimensionally stable brace member of glass fibers which is pressed to the desired mass density and is sintered or fritted and is arranged in the insulating zone. The glass fibers are plastically deformed in the said brace member by the fritting operation so that the configuration produced by the pressing operation and the mass density are maintained.

Preferably, the thermal insulation will constitute the casing of an insulating vessel.

In accordance with an advantageous application of the invention to an insulating vessel with a high vacuum insulation structure and more particularly in the case of a latent heat storage means for motor vehicles, comprising an inner container and an outer container surrounding the inner one with the formation of an insulating zone by being in spaced relationship thereto, each of the containers having an encompassing surface extending between two opposite ends, ducts extending through the insulating zone for the supply and removal of a heat transfer medium, and a supporting pore-forming brace means between the inner container and the outer container, the insulating vessel is so designed that a brace member surrounding the encompassing surface of the inner container and manufactured of a load-bearing material, more particularly glass fiber, is in contact with the encompassing surface of the inner container and in two sections adjacent to its two end walls also makes contact with the encompassing surface of the outer container, while between the two sections on its side, which is turned towards the outer container, it is surrounded by a pretensioned film and is maintained with a clearance between it and the encompassing surface of the outer container.

In accordance with an further beneficial development of the invention at one end of the container a brace member is present, made of the load-bearing pore-forming material, in the center of the end walls of the inner and the outer containers and clamped between the same, the end wall positioned at this end of the outer container it is constituted by an elastic diaphragm and at the other end of the container an annular brace member of the load-bearing, pore-forming material is clamped between the sections which are adjacent to the encompassing surface and are radially to the outside, of the mutually opposite end walls of the inner container and the outer container.

The invention will now be described in more detail with reference to the accompanying drawings, which show working embodiments thereof.

LIST OF THE SEVERAL VIEWS OF THE FIGURES

DETAILED ACCOUNT OF WORKING EMBODIMENTS OF THE INVENTION

Figure 1:
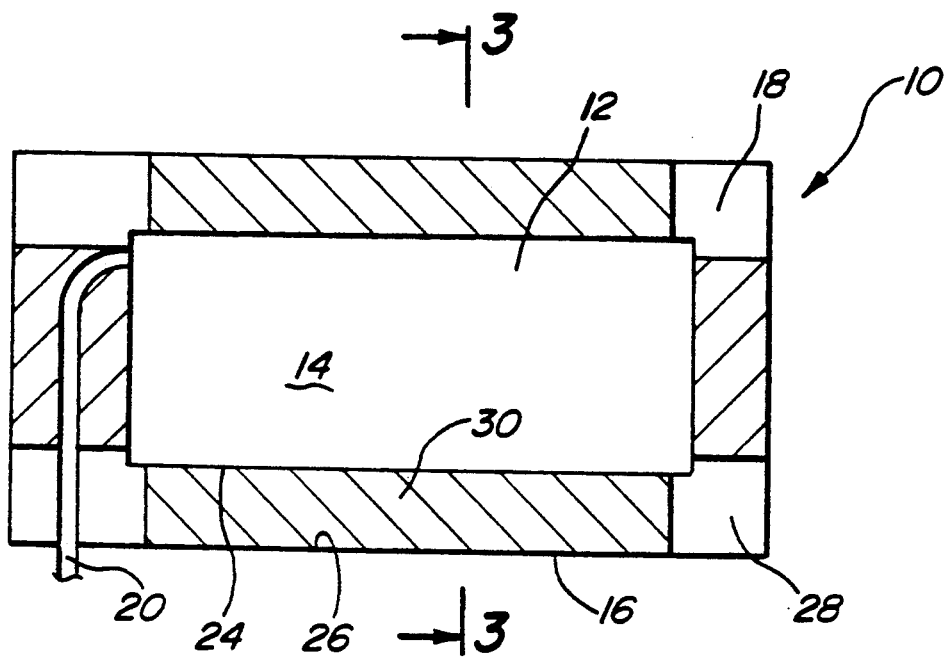
FIG. 1 shows a diagrammatic section taken through a latent heat storage means.

In the figures like parts are denoted by like reference characters.

The heat storage zone, which has a generally known structure, of the latent heat storage means generally referenced 10 is not shown in detail and in fact only the storage core 14 is illustrated which is enclosed in an inner container 12. The inner container 12 is surrounded with a clearance by an outer container 16 so that between the inner container 112 and the outer container 16 there is an insulating zone 18, which is not illustrated to scale in the figures and in fact its thickness is substantially exaggerated. The insulating zone is traversed by two ducts, which function to introduce the heat transfer medium into the heat storage core 14 and to return the same from the core 14. In the sectional view the two ducts obscure each other so that only one duct 20 is visible.

In the insulating zone there is preferably a high vacuum for preventing heat flow and heat conduction by gases, while thermal radiation is prevented by a reflecting coating on the delimiting means of the insulating zone.

A brace means arranged between the inner container 12 and the outer one 16 is to be adapted to take up the load due to the pressure difference between the ambient pressure and the vacuum in the insulating zone and furthermore to withstand, if necessary, mechanical forces by bracing the inner container 12 in relation to the outer one 16 and also in the case of inertial forces, which are produced by the weight of the inner container 12 or by vibrations or braking or acceleration effects during the operation of motor vehicles.

One possible design of the heat storage means 10 is such that the inner container and the outer container 16 are in the form of coaxially arranged circular cylinders. Such a configuration of the heat storage means 10 is assumed in FIG. 2. A preferred field of application of the invention is represented by heat storage means with planar outer surfaces as for instance in the form of a cube or other parallelepipedon. Such a form is assumed in FIG. 1, as will be gathered from the section of FIG. 5.

In the case of the embodiment of the invention of FIG. 1 the mutually opposite planar surfaces as for instance 24 and 26, of the inner container 12 and of the outer one 16, with the exception of the corner zones 28, are each supported on each other by means of continuous brace members 30. The brace member consist of glass fibers, the density of the said material being so selected that it is just sufficient to take up the likely or expected pressure or thrust load.

In the case of a cubic heat storage means with planar walls a load on the brace members of 1 bar is to be expected. And as already mentioned presently such flat-walled insulating vessels are employed with conventional glass fiber insulation whose insulating material has density of 250 g/l and a fiber thickness of approximately $5^{-3}$ mm, which has a load supporting capacity of 10 bar and is arranged with an insulating thickness of 15 mm. On suitably taking into account, following the teaching in accordance with the invention in the illustrated embodiment of the invention, the maximum load to be taken up of 1 bar, the density of the brace members may be reduced to 25 g/l. Therefore the solid state conductivity is reduced to one tenth and will for instance go down from 2 watts to 0.2 watt. Since furthermore even 0.6 watt is also acceptable there is the possibility of reducing the insulating thickness to one third, that is to say to 5 mm so that the volume of the insulating zone is substantially reduced as well. Simultaneously the weight of the insulating material employed is reduced, that is to say on the one hand owing to the density decreased to one tenth and on the other hand owing to the reduction to one third of the insulating thickness so that the overall reduction is to one thirtieth of the value in a conventional glass fiber insulating arrangement.

Figure 2:
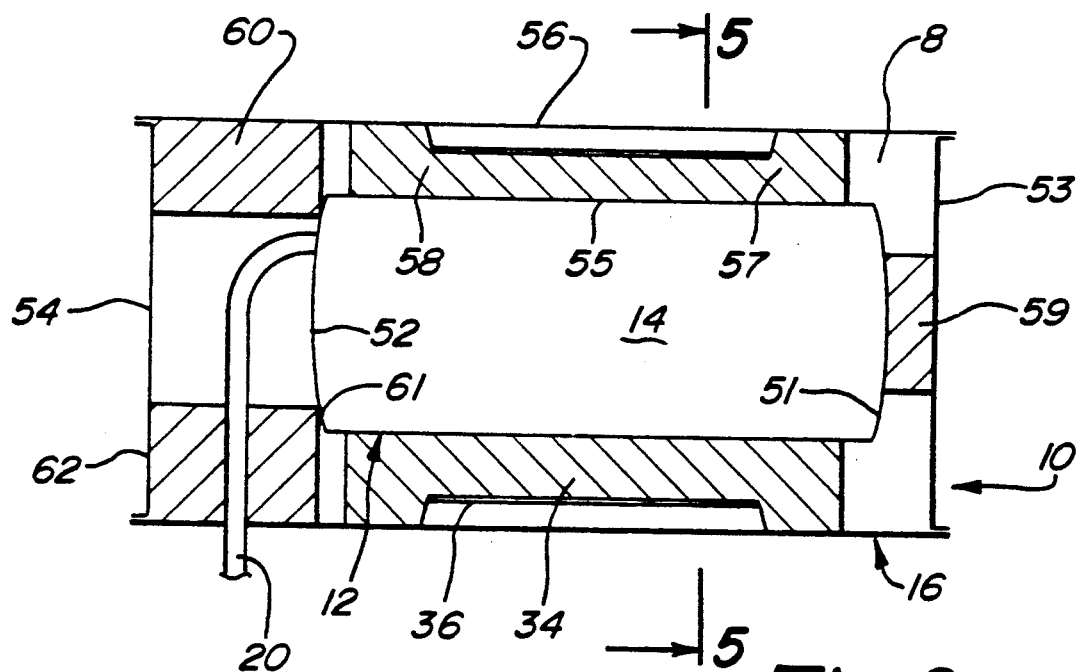
FIG. 2 shows a diagrammatic section taken through a somewhat modified embodiment of the latent heat storage means.
Figure 3:
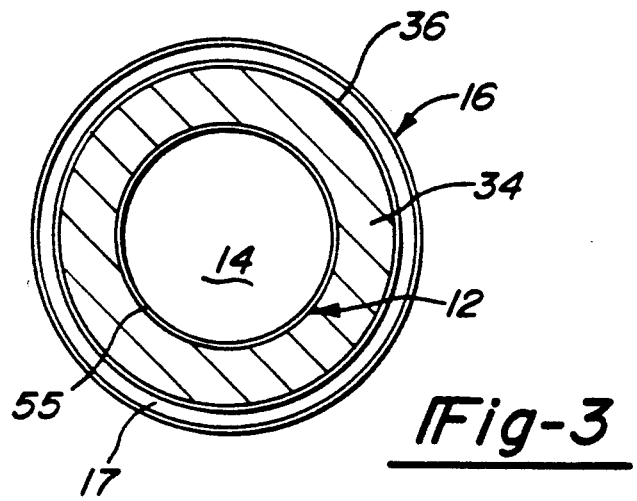
FIG. 3 shows a section taken on the line III—III of FIG. 2.

In the case of an insulating vessel with circularly cylindrical inner and outer containers 12 and, respectively, 16 as illustrated in FIGS. 2 and 3 owing to the dimensional stability of the cylindrical walls a load supporting capacity of the brace members of 0.5 bar is sufficient, for which reason the density of the insulating material may be reduced to 12.5 g/l. The load bearing capacity of the brace members is only required if a local deformation, as for instance owing to buckling or denting, the dimensional stability of cylindrical wall is impaired.

In the illustrated working embodiment of FIG. 2 therefore a brace member 34, which surrounds the cylindrical encompassing surface 55 of the inner container 14 is lifted over a major part of the length of the inner container 14 by a film 36, which surrounds it under tension, with a highly reflecting effect with the formation of an insulating gap 17, which improves the insulating effect, and is drawn radially inwards from the encompassing surface 56 of the outer container 16 so that it is only in the sections 57 and 58 associated with the two end walls 51 and 52 of the inner container 14 that there is a bridge supporting the inner container 14. It is only when the outer container 16 is buckled inwards adjacent to the insulating gap 17 and it looses its self-supporting cylindrical configuration that the brace member 34 also performs its bracing action in this dented zone as well.

On the side, which is remote from the ducts 20, of the inner container 14 its side wall 51 is supported on the associated end wall 53 of the outer container 16 via a brace members 59, which are arranged centrally with respect to the two end walls 51 and 53. While at the other end of the insulating vessel 10 an annular brace member 60 is so arranged that in the sections 61 and 62, respectively, which are radially to the outside and are adjacent to the encompassing surface 55 of the inner container 14 and, respectively, the encompassing surface 56 of the outer container 16, of the mutually opposite end walls 52 and 54, respectively, of the inner container and of the outer container that it constitutes a fixed bearing which supports the inner container 14 in relation to the outer one 16 in the axial direction. The end wall 53 located at the other end of the insulating vessel 10, of the outer container 16 is made in the form of an elastic diaphragm so that the brace member 59 functions as an axial movable bearing, which is adapted to cooperate with the elastic end wall 53 in taking up changes in length due to thermal expansion.

Figure 4:
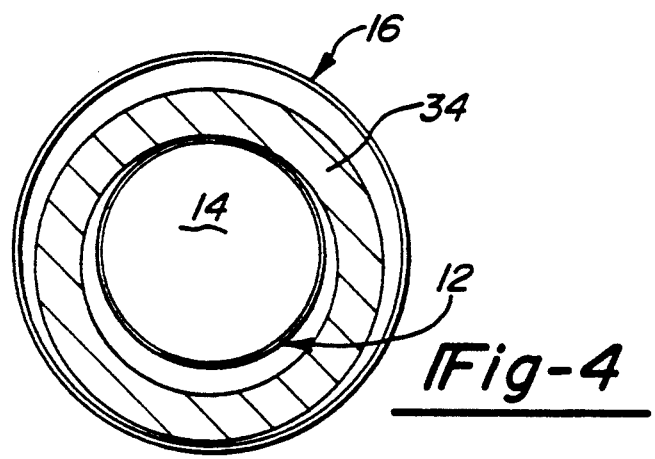
FIG. 4 is sectional view corresponding to FIG. 3 of another embodiment of the invention.
Figure 5:
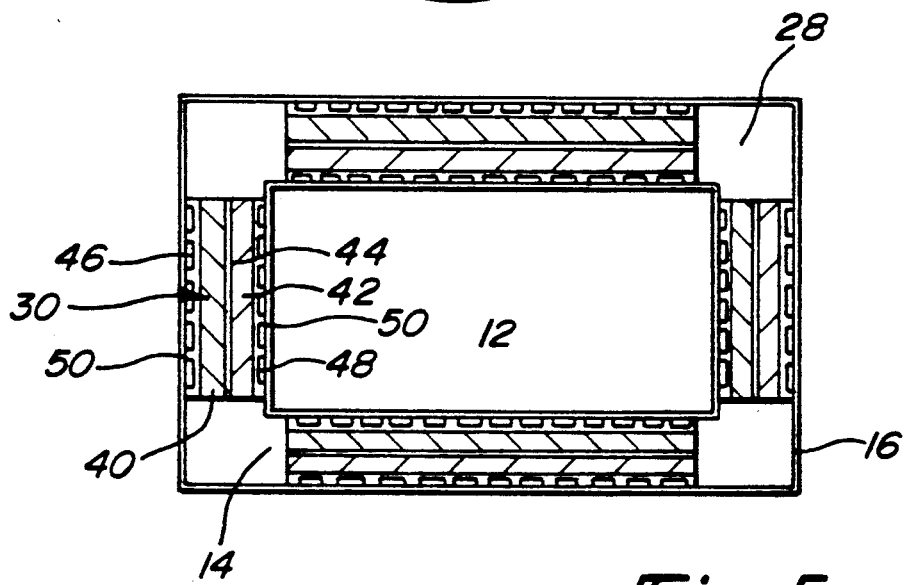
FIG. 5 shows a sectional view taken on the line V—V of FIG. 1 of a further embodiment of the invention differing from that of FIG. 1.

Another possibility is shown in FIG. 4. The brace member 34 is constituted by a self-supporting shell, whose inner diameter is larger than the outer diameter of the inner container 12, while its outer diameter is smaller than the inner diameter of the outer container 16. Thus as long as the outer container 16 is not deformed the brace member 34 will engage the inner container 12 for instance in the illustrated manner under the effect of gravity, there only being a linear contact and solid state conduction itself being very low if the brace member should simultaneously make linear contact with the outer container 16. FIG. 5 shows a further possible modification of the design of the brace member, this time as an example of the heat storage means 10 illustrated in FIG. 1 with plane surfaces. The brace member 30 is constituted by two parallel plies or layers 40 and 42 of glass fiber material between which there is a heat reflecting film 44. The surfaces facing the inner container 12 and, respectively, the outer container 16, of the brace member 30 are covered with reflecting films 46 and, respectively, 48, which have knob-like projections 50 so that consequently the contact of the brace member 30 with the inner and with the outer container is limited to a few contact points as defined by the projections.

I claim:

1. A vacuum thermal insulation structure suitable for the transmission of thrust forces and more particularly for heat storage means in motor vehicles, comprising an inner container and an outer container and an evacuated insulating zone between the containers and a load-bearing brace member of pore-forming insulating material extending between the two containers and substantially fully surrounding the inner container, wherein the load-bearing, pore-forming insulating material in the insulating zone is arranged as the sole brace material, at least in the zones with a need to be supported, continuously, the mass density of the insulating material is so reduced that it is just sufficient to take up the thrust forces to be transmitted and the gas pressure is reduced in accordance with the desired insulating effect.

2. The vacuum vessel as claimed in claim 1, wherein the vacuum in the evacuated insulating zone is a high vacuum and in the entire insulating zone means are arranged for checking thermal radiation.

3. The vacuum vessel as claimed in claim 1, wherein the bracing means is prevented from making thrust contact with one of the delimiting means associated with the two different temperature zone, of the insulating zone.

4. The vacuum vessel as claimed in claim 3, wherein the walls are curved and a film is wrapped over the brace means with clearance over its side facing the concave limit of the insulating zone.

5. The vacuum vessel as claimed in claim 4, wherein the film exerts a compressive effect on the insulating material constituting the brace means.

6. The vacuum vessel as claimed in claim 4, wherein the basic material for the film has a low coefficient of thermal conductivity.

7. The vacuum vessel as claimed in claim 4, wherein at least one surface of the film consists of a metal with a high reflecting effect for thermal radiation.

8. The vacuum vessel as claimed in claim 1, wherein the walls are curved and the brace means maintains a clearance between it and the concave delimiting means of the insulating zone.

9. The vacuum vessel as claimed in claim 8, wherein the brace means is in the form of a self-supporting member, whose outer diameter is less than the inner diameter of the outer wall and whose inner diameter is larger than the outer diameter of the inner wall of the insulation zone.

10. The vacuum vessel as claimed in claim 1, wherein the thrust contact of the brace means with at least one of the delimiting means associated with the two different temperature zones, of the insulating zone is limited to a few contact points.

11. The vacuum vessel as claimed in claim 10, wherein the means limiting thrust contact of the brace means is covered at least on one side by a film with molded projections.

12. The vacuum vessel as claimed in claim 1, wherein the insulating material is prevented from directly contacting the two delimiting means and the elements preventing contact are connected with the insulating material to constitute a prefabricated sub-assembly.

13. The vacuum vessel as claimed in claim 1, wherein the brace means consists of at least two parallel plies of load-bearing insulating material and between each pair of such plies a thermally reflecting film is arranged.

14. The vacuum vessel as claimed in claim 1, wherein said load-bearing insulating material is in the form of a brace member in the insulating zone which is pressed with a preload to the desired mass density and then fritted for dimensional stability, such member being manufactured of glass fiber.

15. The vacuum vessel as claimed in claim 1, in the form of a casing for an insulating vessel.

16. An insulating vessel with a vacuum insulating, latent heat storage means for motor vehicles comprising an inner container and an outer container arranged to surround the inner container with clearance so as to constitute an insulating zone, each of the containers having an encompassing surface extending between two opposite end walls, ducts extending through the containers for the supply and the removal of a heat transfer medium and a supporting pore-forming brace means between the inner container and the outer container, such a brace member being provided to surround the encompassing surface of the inner container and consists of a load-bearing pore-forming material, more particularly glass fiber and contacts the encompassing surface of the inner container and, in two sections adjacent to its two end walls, also the encompassing surface of the outer container, while between the two sections it is wrapped around by a film on its side facing the outer container compressing the material and it is maintained at a distance from the encompassing surface of the outer container.

17. The vacuum vessel as claimed in claim 16, wherein at one end of the container such a brace member made of the load-bearing, pore-forming material in the center of the end walls of the inner container and of the outer container between the same, and the end wall located at this end of the outer container is manufactured in the form of an elastic diaphragm and at the other end of the container an annular brace member of the load-bearing, pore-forming material is clamped between the sections, which are adjacent to the encompassing surface and are radially to the outside, of the mutually opposite end walls of the inner container and of the outer container.

* * * * *